Sept. 22, 1953     J. F. FITZGERALD     2,652,655
TRAP MECHANISM
Filed July 5, 1952
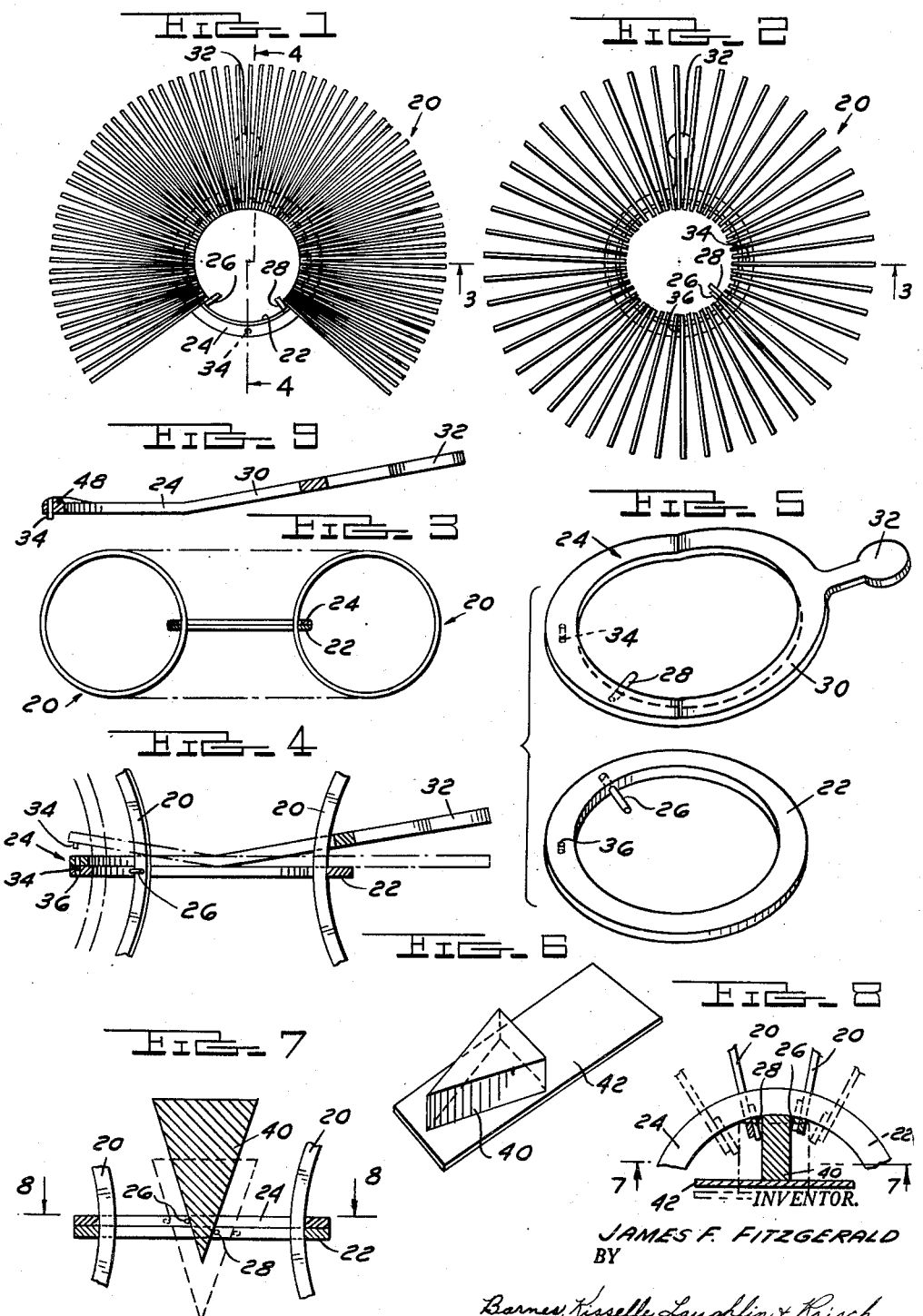

Patented Sept. 22, 1953

2,652,655

UNITED STATES PATENT OFFICE 2,652,655

TRAP MECHANISM

James F. Fitzgerald, Detroit, Mich.

Application July 5, 1952, Serial No. 297,297

9 Claims. (Cl. 43—60)

This invention relates to a trap mechanism and is especially concerned with a trap for small rodents, such as mice, rats, and so forth.

The object of the trap is to catch these rodents in live condition for scientific purposes, and to accomplish this, the invention consists briefly of a coil spring which is confined in circular form by retaining center rings.

These rings have a slip fit relative to each other, and upon the tripping of a bait mechanism, a coil spring which has been in semicircular form snaps into a full circular form to close the trap.

Drawings accompany the specification, and the various views thereof may be briefly described as:

Figure 1, a top view of the trap mechanism in set position.

Figure 2, a similar view to Figure 1 showing the trap in sprung position.

Figure 3, a sectional view on line 3—3 of Figure 2.

Figure 4, a sectional view on line 4—4 of Figure 1.

Figure 5, a view illustrating the holding mechanism of the device in spaced relation.

Figure 6, a view of an opening wedge for larger traps.

Figure 7, a view showing the manner in which the wedge operates.

Figure 8, a sectional view on line 8—8 of Figure 7.

Figure 9, a view of a modified construction showing the counter-balance plate on the actuator.

Referring to the drawings, it will be seen that the trap consists of a coil of wire 20 which is separable at one end as shown in Figure 1. This coil is under compression as shown in Figures 1 and 2. It is confined in circular form by a double ring arrangement composed of a bottom ring 22 and a top ring 24, the top ring having a greater inner diameter than that of the bottom ring and being narrower than the bottom ring, facilitating movement as shown in Fig. 4 from the dash and dot line position to the full line position of the ring 24. These rings are shown best in Figure 5. Each has a radially extending pin 26 and 28 respectively.

The top ring 24 has a canted portion 30 which is provided with a projection 32 for receiving bait. A small pin 34 projects downwardly from a portion of the ring 24 on the opposite side of the bait projection, this projection 34 being positioned to co-operate with a hole 36 in the bottom ring 22.

As the parts are shown in Figure 4, the pin 34 is engaged in hole 36 and the bait projection 32 is canted upwardly. In order for the parts to reach this position, the rings must be rotated relative to each other so that the pins 26 and 28 reach the relative positions shown in Figure 1.

In this position, with the pin 34 positioned in the hole 36, the device is set. Prior to the setting of the trap the bait should be applied to the projection 32.

With this arrangement the rodent will enter the coil, and upon attempting to remove the bait from the projection 32, he will pull it downwardly to the point that pin 36 will release, thus allowing the coil spring to close as shown in Figure 2.

The coil should be of sufficient size and the compression should be great enough that any particular rodent which can get into the cage cannot separate the coil to escape.

Any cross section of coil can be used, either flat, square or round, although it is thought that the round would probably be the least expensive. If desired, the coil can be tempered into a circular or straight position. A coil which is tempered in a straight position will be confined in the circular position between rings 22 and 24.

For larger animals it may be difficult to separate the coils to the set position manually. In Figure 6 a wedge is shown at 40 mounted on a plate 42 for forcing the pins 26 and 28 apart. Slight manual separation of these pins allows the end of the wedge to be inserted wherein downward pressure will move the pins apart to the position shown in Figure 1.

The device can be assembled either by leaving rings 22 and 24 open and riveting or welding them together after they are inserted to the assembled position, or by threading the coil onto the rings once they are placed together.

In Figure 9 a modified construction is shown for the top ring in which a counterweight 48 is applied to the side of the ring opposite to the bait projection 32. This counterweight provides a balance for the projection 32 and any bait that may be applied thereto.

It will thus be seen that I have shown a relatively simple but effective small animal trap which can be manufactured inexpensively and which is suitable for catching animals in a live condition.

Other possible changes may be made in the design of the trap without departing from the inventive principle disclosed herein.

What I claim is:

1. A small animal trap which comprises a coil spring, means for temporarily confining said coil spring in partial circular form having open ends defining an animal entrance, and a bait trip mechanism to release said confining means to allow the coil to snap to a closed circular form.

2. A trap for animals composed of a coil spring, retaining rings acting on the insides of the coils confining said spring in a circular form, means to lock said coil against its own resilience into a partial circle, and a trip mechanism to release said locking means to allow said coil to move by its own resilience to a fully closed, circular form.

3. A device as defined in claim 2 in which the central retaining rings for the coil spring comprise two matched rings confined for rotation relative to each other, one of said rings having a canted portion, and means for locking a portion of said canted ring to said first ring, and other means adapted to hold a bait and for releasing said locked portion to allow said rings to slip relative to each other.

4. An animal trap which comprises a coil spring having an at-rest position in extended form, means confining said spring in compressed form in a circular shape comprising upper and lower rings acting on the insides of the coils of the coil spring, said rings being rotatable relative to each other and each having an inwardly projecting portion to engage the respective ends of said coil spring, means on said rings to inter-engage when said coil spring is compressed to a partially open position, and depressible trip means on one of said rings to release said rings for free relative movement permitting the coil to close by compressive action.

5. A device as defined in claim 4 in which said trip means consist of a canted portion at one end of the upper ring, with a bait holding projection thereon, and the inter-engaging means consists of a device on the opposite end of the upper ring engaging the lower ring when said rings are moved to a particular relative position rotatably.

6. A device as defined in claim 4 in which the upper ring has a greater inner diameter than that of the lower ring.

7. A device as defined in claim 4 in which the upper ring has a canted portion with a bait holding projection on one side, the opposite side of the upper ring having a counterweight for balancing the bait projection.

8. An animal trap which comprises a coil spring having an at-rest position in extended form, upper and lower rings extending through said coil spring confining the same in compressed form in a circular shape, said rings being rotatable relative to each other and each having an inwardly projecting portion to engage the respective ends of said coil spring, means on said rings to inter-engage when said coil spring is compressed to provide an animal opening, and depressible trip means on one of said rings to release said rings for free relative movement permitting the coil spring to close by itself on compressive action, said trip means consisting of a canted portion at one end of the upper ring with a bait holding projection thereon, and the inter-engaging means consisting of a weighted device on the opposite side of the upper ring engaging the lower ring when said rings are moved to a particular relative position rotatably.

9. A trap comprising a coil spring, and confining rings within the spring having inter-engaging means to hold the spring in compressed condition on the rings to provide an animal opening between the ends of the spring, one of said rings having a part within the coil adapted to be intercepted by an animal moving within the coil causing said part to release said inter-engaging means and the compression in the spring, said spring being adapted to be compressed by a wedge to cause inter-engagement of said inter-engaging means.

JAMES F. FITZGERALD.

References Cited in the file of this patent

UNITED STATES PATENTS

| Number | Name | Date |
| --- | --- | --- |
| 488,996 | Fry | Jan. 3, 1893 |
| 624,665 | Lewis | May 9, 1899 |
| 639,135 | Benseler | Dec. 12, 1899 |
| 1,818,315 | French | Aug. 11, 1931 |